US011184472B2

(12) United States Patent
Rogers

(10) Patent No.: US 11,184,472 B2
(45) Date of Patent: Nov. 23, 2021

(54) ELECTRONIC DEVICE CASE

(71) Applicant: Renardo P. Rogers, Calumet City, IL (US)

(72) Inventor: Renardo P. Rogers, Calumet City, IL (US)

(*) Notice: Subject to any disclaimer, the term of this patent is extended or adjusted under 35 U.S.C. 154(b) by 0 days.

(21) Appl. No.: 16/749,360

(22) Filed: Jan. 22, 2020

(65) Prior Publication Data

US 2020/0236208 A1 Jul. 23, 2020

Related U.S. Application Data

(60) Provisional application No. 62/795,464, filed on Jan. 22, 2019.

(51) Int. Cl.
*H04B 1/38* (2015.01)
*H04M 1/72409* (2021.01)
*G06F 1/16* (2006.01)
*G06F 3/041* (2006.01)
*G06F 3/02* (2006.01)

(52) U.S. Cl.
CPC ........ *H04M 1/72409* (2021.01); *G06F 1/166* (2013.01); *G06F 1/1616* (2013.01); *G06F 1/1618* (2013.01); *G06F 1/1654* (2013.01); *G06F 1/1686* (2013.01); *G06F 1/1688* (2013.01); *G06F 3/0221* (2013.01); *G06F 3/041* (2013.01)

(58) Field of Classification Search
None
See application file for complete search history.

(56) References Cited

U.S. PATENT DOCUMENTS

| 7,330,737 | B2 | 2/2008 | Mahini | |
| 7,412,258 | B1* | 8/2008 | Lipponen | G06F 1/1616 |
| | | | | 455/550.1 |
| 8,265,319 | B2 | 9/2012 | Groset et al. | |
| RE45,320 | E | 1/2015 | Jaffe et al. | |
| 9,923,587 | B2* | 3/2018 | Aldana | H04B 5/0075 |
| 2007/0077965 | A1 | 4/2007 | Fox | |
| 2011/0216495 | A1 | 9/2011 | Marx | |
| 2012/0299318 | A1* | 11/2012 | Murphy | A45F 5/00 |
| | | | | 294/25 |
| 2012/0308064 | A1 | 12/2012 | Matthews | |
| 2013/0260822 | A1* | 10/2013 | Wu | G06F 1/1616 |
| | | | | 455/556.1 |
| 2016/0309009 | A1* | 10/2016 | Haskell | H04M 1/21 |

* cited by examiner

*Primary Examiner* — Nhan T Le
(74) *Attorney, Agent, or Firm* — Boudwin Intellectual Property; Daniel Boudwin

(57) ABSTRACT

An electronic device case is shown and described. The device has a protective base member and a protective flap member. The protective base member has an exterior base surface and an interior base surface with a recess disposed in the interior base surface. The recess removably receives an electronic device. The protective flap member has an exterior flap surface and an interior flap surface. A display screen and at least one speaker are disposed in the interior flap surface of the protective flap member. The protective flap member is pivotally affixed to the protective base member and the protective base member and the protective flap member selectively move between an open and a closed orientation. The closed orientation is defined by the interior flap surface of the protective flap member resting against the interior base surface of the protective base member.

15 Claims, 4 Drawing Sheets

ELECTRONIC DEVICE CASE

CROSS REFERENCE TO RELATED APPLICATIONS

This application claims the benefit of U.S. Provisional Application No. 62/795,464 filed on Jan. 22, 2019. The above identified patent application is herein incorporated by reference in its entirety to provide continuity of disclosure.

BACKGROUND OF THE INVENTION

The present invention relates to electronic device accessories. More particularly, the present invention provides for an electronic device case which can be used to amplify the audio output and enlarge the video output of an electronic device such as a cell phone.

Many people read social media watch videos, listen to music and generally avail themselves of the Internet on small portable electronic devices such as cell phones. These devices are small enough to easily fit into a pocket or small bag making them extremely convenient and available at a moment's notice. Unfortunately, the small size also limits the size of the screen and quality of the audio that can be output from such a device. Many people are forced to squint at their cellphone screens and carry earphones or headphones to hear the audio over the ambient noise. Some current models of cellphones do not have an audio port to which a set of headphones can be attached, necessitating the use of additional adapters. Headphones are also not easily shared and where the user desires to share the audio with multiple people, the cellphone's speakers must be relied upon.

Devices have been disclosed in the known art that relate to electronic device accessories. These include devices that have been patented and disclosed in patent application publications. However, the devices in the known art have several drawbacks. Small electronic devices such as cellphones are notoriously fragile. People routinely purchase and utilize after-market cases to protect their devices from scratches, bumps and falls. These cases provide protection to the device at the expense of their small form factors. Typically, the cases encapsulate the cellphone without adding any additional function to the device. Some devices function as cradles that are configured to receive a portion of the cellphone and act as a docking station. However, these devices do not protect the cellphone and can be quite large to the point where utilizing a laptop or tablet can be a smaller, easier, and simpler alternative. Other docks are limited in functionality and only provide a means to enhance a single aspect of the electronic device such as the audio via speakers which plug into the electronic device.

The present invention substantially diverges in design elements from the known art and consequently it is clear that there is a need in the art for an improvement to existing electronic device accessories. In this regard the present invention substantially fulfills these needs.

SUMMARY OF THE INVENTION

In view of the foregoing disadvantages inherent in the known types of electronic device accessories now present in the prior art, the present invention provides an electronic device case wherein the same can be utilized to encapsulate and protect an electronic device, such as a cellphone, while amplifying the audio output and enlarging the video output of such an electronic device. The present electronic device case comprises a protective base member and a protective flap member. The protective base member has an exterior base surface and an interior base surface with a recess disposed in the interior base surface. The recess removably receives an electronic device. The protective flap member has an exterior flap surface and an interior flap surface. A display screen and at least one speaker are disposed in the interior flap surface of the protective flap member. The protective flap member is pivotally affixed to the protective base member and the protective base member and the protective flap member selectively move between an open and a closed orientation. The closed orientation is defined by the interior flap surface of the protective flap member resting against the interior base surface of the protective base member.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
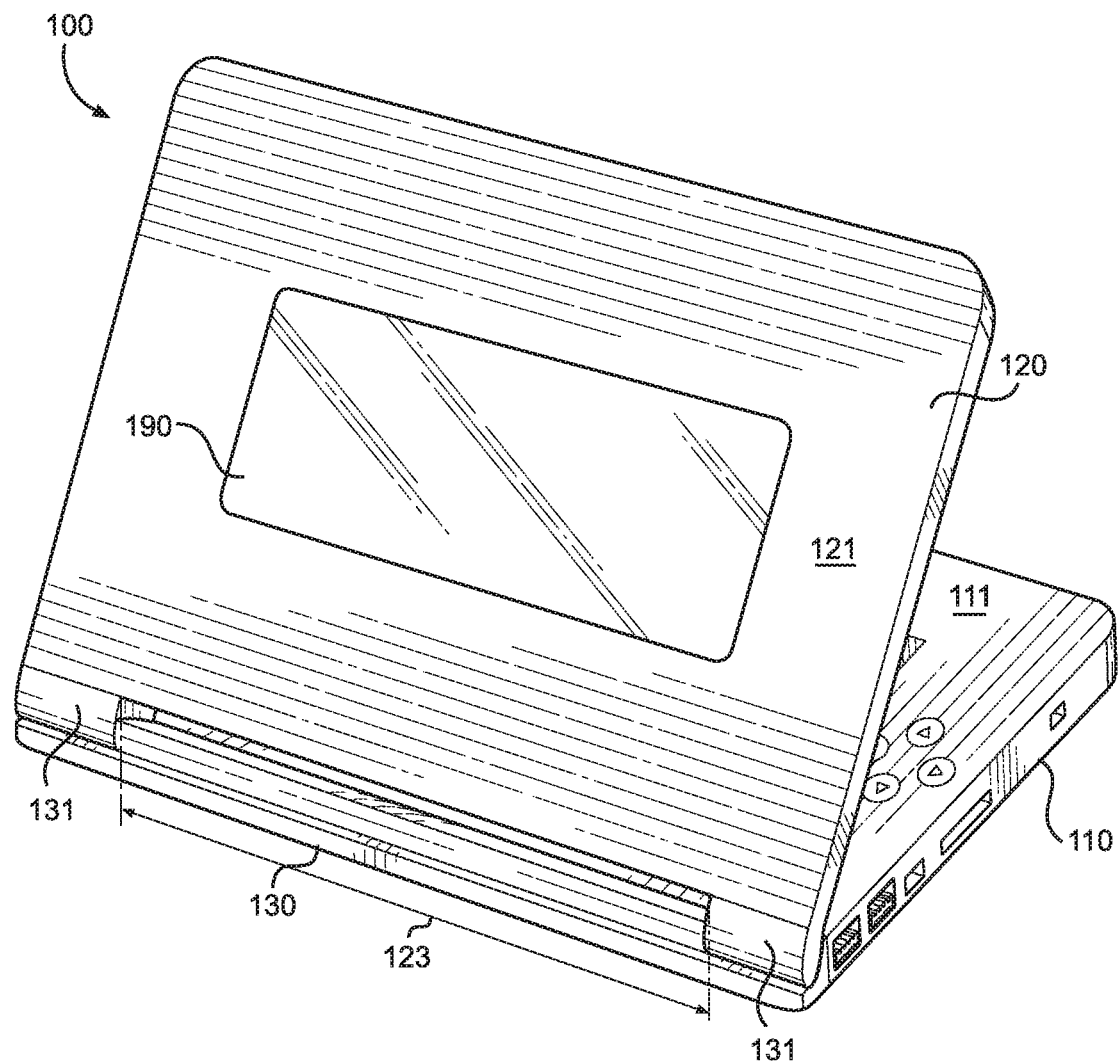
FIG. 1 shows a rear perspective view of an embodiment of the electronic device case, in an open orientation.

Reference is made herein to the attached drawings. Like reference numerals are used throughout the drawings to depict like or similar elements of the electronic device case. For the purposes of presenting a brief and clear description of the present invention, a preferred embodiment will be discussed as used for the electronic device case. The figures are intended for representative purposes only and should not be considered to be limiting in any respect.

Referring now to FIG. 1, there is shown a rear perspective view of an embodiment of the electronic device case, in an open orientation. The electronic device case 100 comprises a protective flap member 120 and a protective base member 110. In the shown embodiment, the protective flap member 120 and the protective base member 110 comprise rectangular cross-sections. In the shown embodiment, the protective flap member 120 is pivotally affixed to the protective base member 110. In one embodiment, the protective flap member 120 is pivotally affixed to the protective base member 110 by a hinge 130. In the shown embodiment, the hinge runs along the majority of a perimeter length 123 of the protective flap member 120 and is received by a pair of protrusions 131 disposed on opposing ends of the protective base member 110. Such a configuration gives added strength and stability to the hinge 130. In such an embodiment, the protective base member 110 and the protective flap member 120 selectively move between an open and a closed orientation by rotation of the protective flap member 120 about the hinge 130. In the shown embodiment, the hinge 130 is connected to the pair of protrusions 131 disposed on opposing ends of the protective base member 110. In this manner, both ends of the screen are supported by the connection of the hinge 130 to the pair of protrusions 131. In other embodiments, multiple hinges are disposed along the length 123 in order to provide support throughout the length 123 of the protective flap member 120. The closed orientation of the device is defined by an interior flap surface (as seen in FIG. 4) of the protective flap member 120 resting against an interior base surface 111 of the protective base member 110.

Figure 2:
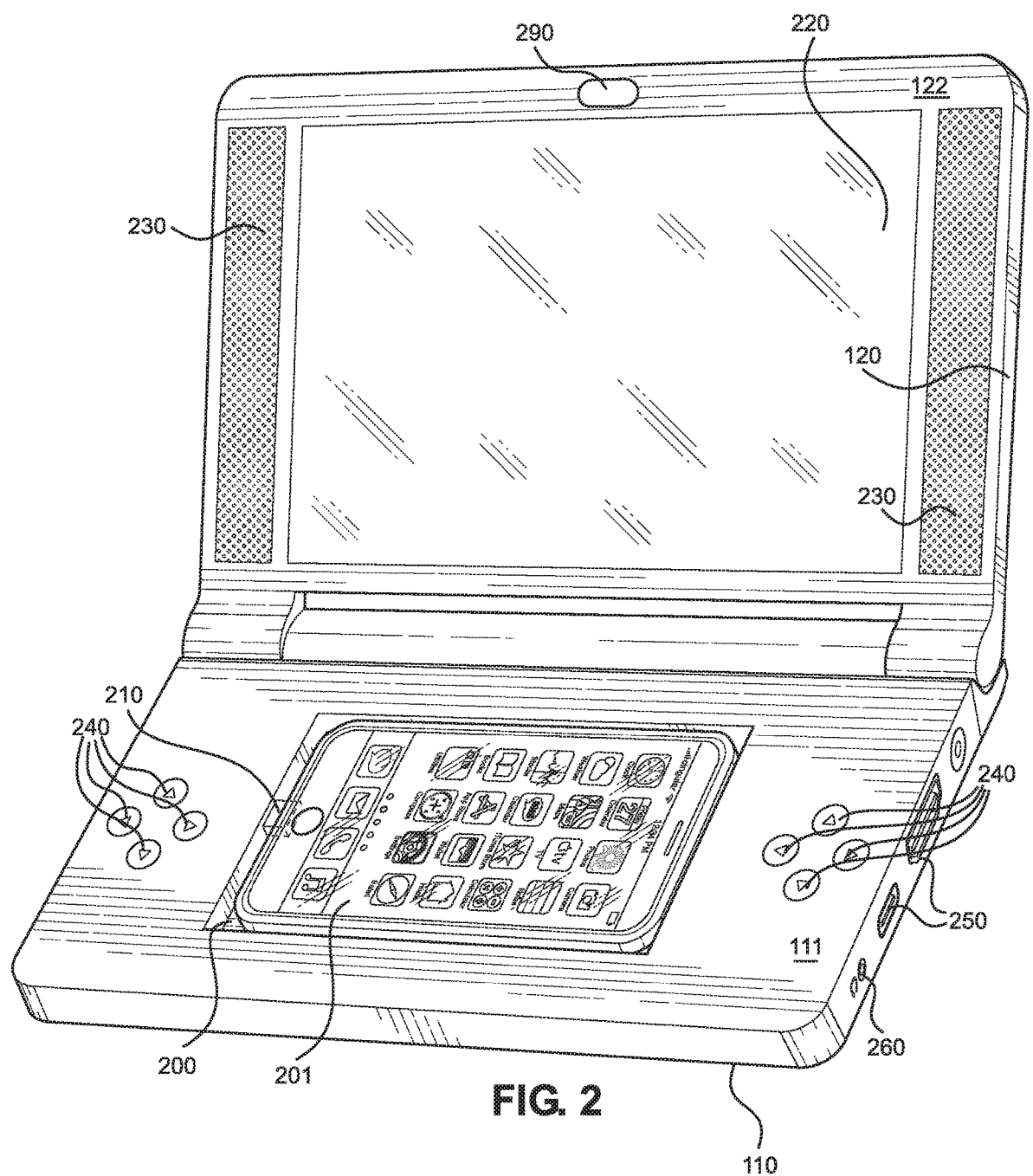
FIG. 2 shows a front perspective view of an embodiment of the electronic device case, in an open orientation.
Figure 4:
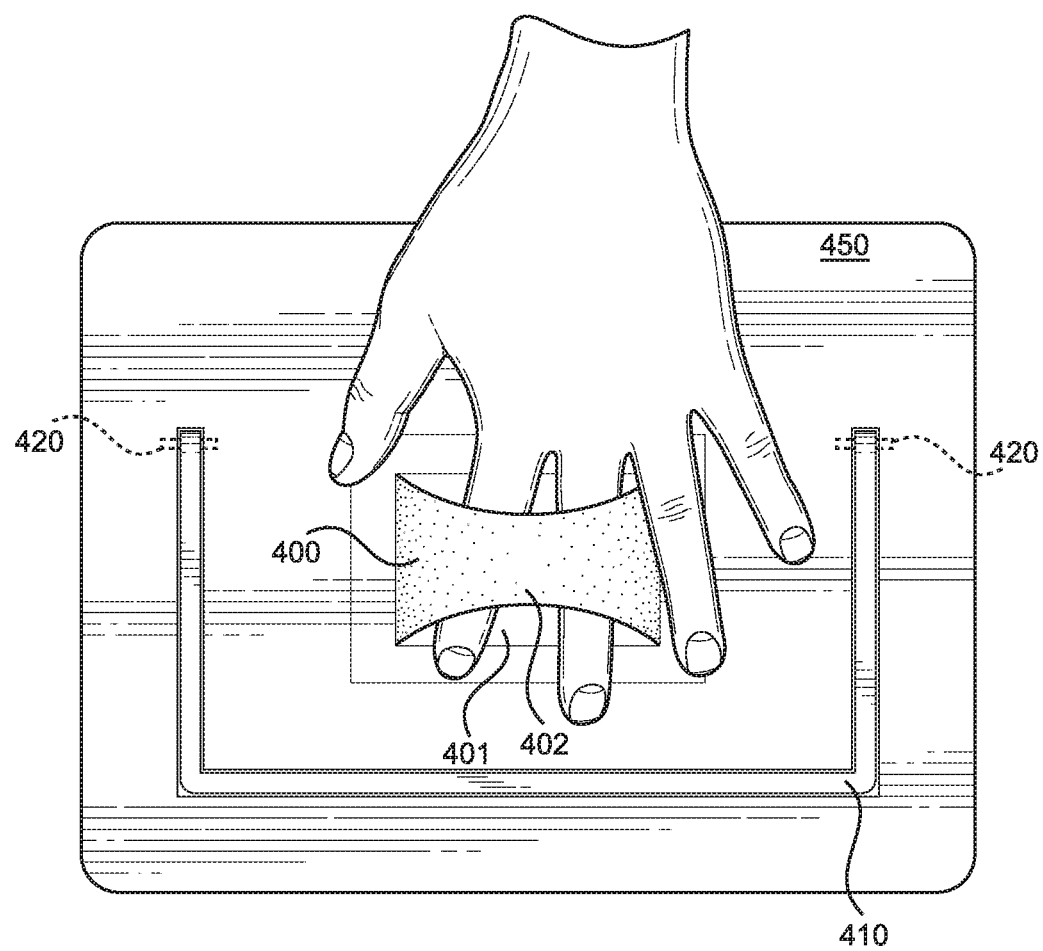
FIG. 4 shows a bottom-up view of an embodiment of the electronic device case.

The protective base member 110 has an exterior base surface (as seen in FIG. 4) and an interior base surface 111. Similarly, the protective flap member 120 has an exterior flap surface 121 and an interior flap surface (as seen in FIG. 2). Both the exterior base surface and the exterior flap surface 121 are comprised of materials that are rugged and durable. The exterior surfaces are configured to dampen a physical impact or shock, whether by the device being dropped, an object being dropped on the device, or other types of impact. The dampening provides protection from such an impact or shock to an electronic device housed within the device, as further detailed below. In various embodiments, the exterior surfaces are comprised of materials which include but are not limited to metal, plastic, rubber, silicone, and glass.

In one embodiment, an external display 190 is disposed in the protective flap member 120. The external display 190 is a screen that can be operably connected to an electronic device as further described below. In various embodiments, the external display 190 can show text messages, caller names, phone number identification and various notifications associated with programs, systems, and device functions. In other embodiments, the external display 190 can show icons and other symbols to indicate various states of the device such as power, battery level, and the like.

Referring now to FIG. 2, there is shown a front perspective view of an embodiment of the electronic device case, in an open orientation. The protective base member 110 comprises a recess 200 disposed in the interior base surface 111, wherein the recess 200 removably receives an electronic device 201 such as a cellphone. In the shown embodiment, the recess 200 is dimensioned to receive the electronic device 201 such that a top surface of the electronic device lies flush with the interior base surface 111. In another embodiment, the recess 200 is dimensioned to receive the electronic device 201 such that the top surface of the electronic device lies below the interior base surface 111 such that the top surface of the electronic device will not make contact with the interior flap surface 122 when the device is in a closed orientation. In this manner, the top surface of the electronic device 201 will not inadvertently rub against the interior flap surface 122. In various embodiments, clips are disposed in the recess 200 which hold the electronic device 201 in place. In one embodiment, the clips are biased such that the clips frictionally engage the electronic device 201 and hold it in place.

In one embodiment, a connection port 210 is disposed in the recess 200 wherein the connection port 210 operably connects the electronic device 201 to the electronic device case. In a further embodiment, the connection port 210 includes a wired connection between the electronic device 201 and the electronic device case. In one such embodiment, the connection port 210 is a USB port. In the shown embodiment, the connection port 210 is a USB port, wherein a male connector is disposed in the recess 200 such that an electronic device 201 can attach to the male connector by sliding a reciprocal connector on the electronic device 201 over the connection port 210. In such an embodiment, the male connector aids in holding the electronic device 201 in place in the recess 200. In one embodiment, the connection port 210 can be swiveled to provide an easier method of attaching the electronic device 201. One of ordinary skill in the art will understand that various types of electronic connectors, including but not limited to USB-A, USB-B, USB-C, micro USB, lightning connectors, and similar connectors are contemplated by this disclosure.

A display screen 220 and at least one speaker 230 are disposed in the interior flap surface 122 of the protective flap member 120. In the shown embodiment, the display screen 220 is larger than the display of the electronic device 201 thereby providing a user with a larger display in which to view video output from the electronic device 201. This larger display screen 220 provides a larger picture which is easier for the user to view and provides the user with the ability to observe fine details of the video output which may not have been possible with the display on the electronic device 201. Similarly, the speakers 230 provide larger speakers than the speakers on the electronic device 201, thereby providing better and clearer sound to the user. In some embodiments, one speaker 230 is disposed on the interior flap surface 122 of the protective flap member 120. However, one of ordinary skill in the art will understand that multiple speakers can be used to provide stereo sound as well as fuller and richer sound. The display screen 220 and the at least one speaker 230 enable a user to select a speaker system and a video display desirable to the user which may differ from the video display and audio system that is incorporated in the electronic device 201.

In one embodiment, the electronic device case includes a plurality of input buttons 240. The plurality of input buttons 240 enable a user to input commands to the electronic device case, and when the electronic device case is connected to an electronic device 201, the plurality of input buttons 240 enable a user to input commands to the electronic device 201. The plurality of input buttons 240 can be used to control a play, pause, stop, fast forward, and rewind functionality, for example. In one embodiment, the plurality of input buttons 240 can be used to control a video game played on a connected electronic device 201. One of ordinary skill in the art will understand that a variety of shapes, sizes, and number of buttons, as well as the relative placement of the buttons on the protective flap member 120 and protective base member 110 is contemplated by this disclosure.

In one embodiment, the electronic device case further comprises at least one connection port 250. The connection ports 250 can receive various types of storage devices including but not limited to flash drives, memory cards, and other removable storage media. The connection ports 250 enable a user to retrieve a file on the storage media and, where applicable, play such media on the display screen 220 and/or the speakers 230. In one embodiment, the connection ports 250 also enable the user to access files on the storage media by a connected electronic device 201, thereby providing a means by which the user can increase the storage space on their electronic device 201 without physically inserted a storage media into the electronic device 201.

In another embodiment, the electronic device case further comprises a headphone port 260. The headphone port 260 can be used in concert with, or in lieu of the speakers 230 of the electronic device case. In this manner, the user can select whether audio output is diverted to a pair of connected headphones, the speakers 230 of the electronic device case, or both. This provides the capability to share audio output with a variety of people, or to put on a pair of headphones so as not to disturb people in the area and allow the user to more clearly hear the audio output over the ambient sound of their surroundings. One of ordinary skill in the art will understand that a standard headphone jack is contemplated by this disclosure, as well as other headphone connectors such as USB.

In one embodiment, a camera 290 is disposed in a top bevel of the interior flap surface 122 of the protective flap member 120. The camera 290 can be operably connected to the electronic device 201, as detailed below, and can be utilized to capture images and video. In one embodiment, the camera 290 can be utilized for teleconferencing when operably connected to the electronic device 201. In one embodiment, the camera 290 is a high-definition camera.

Figure 3A:
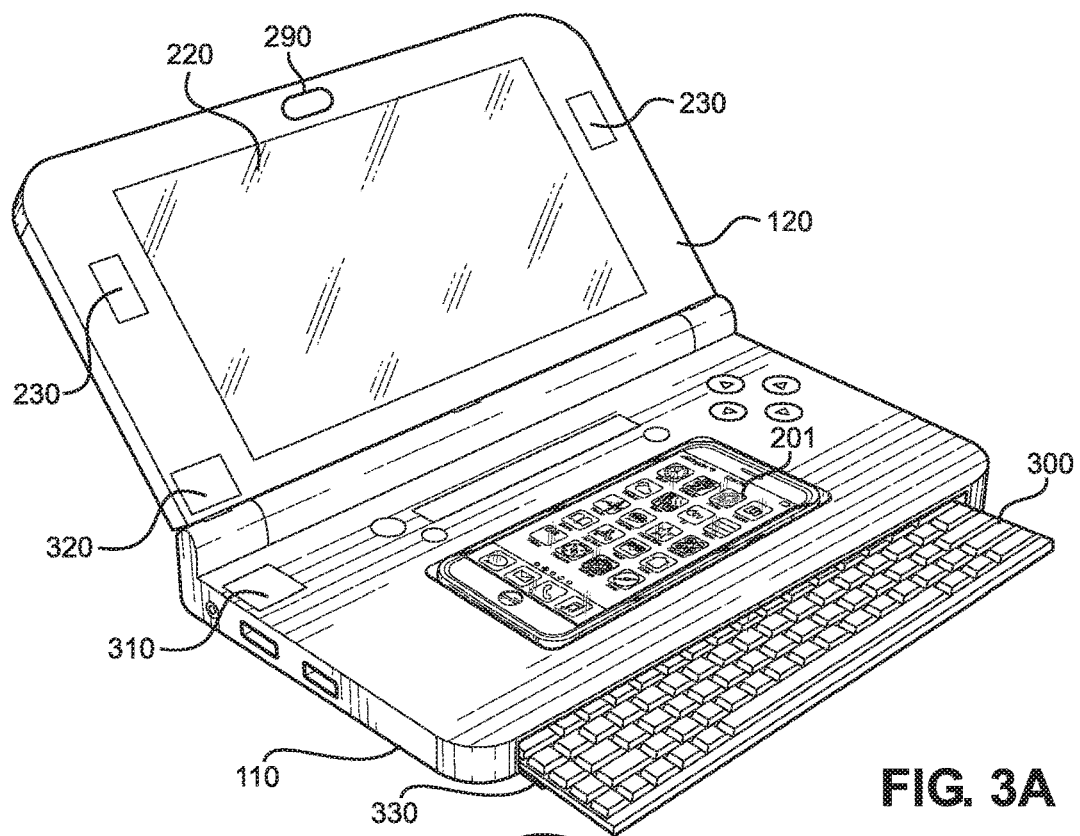
FIG. 3A shows a front perspective view of an embodiment of the electronic device case, with a focus on the removably securable protective flap member.
Figure 3B:
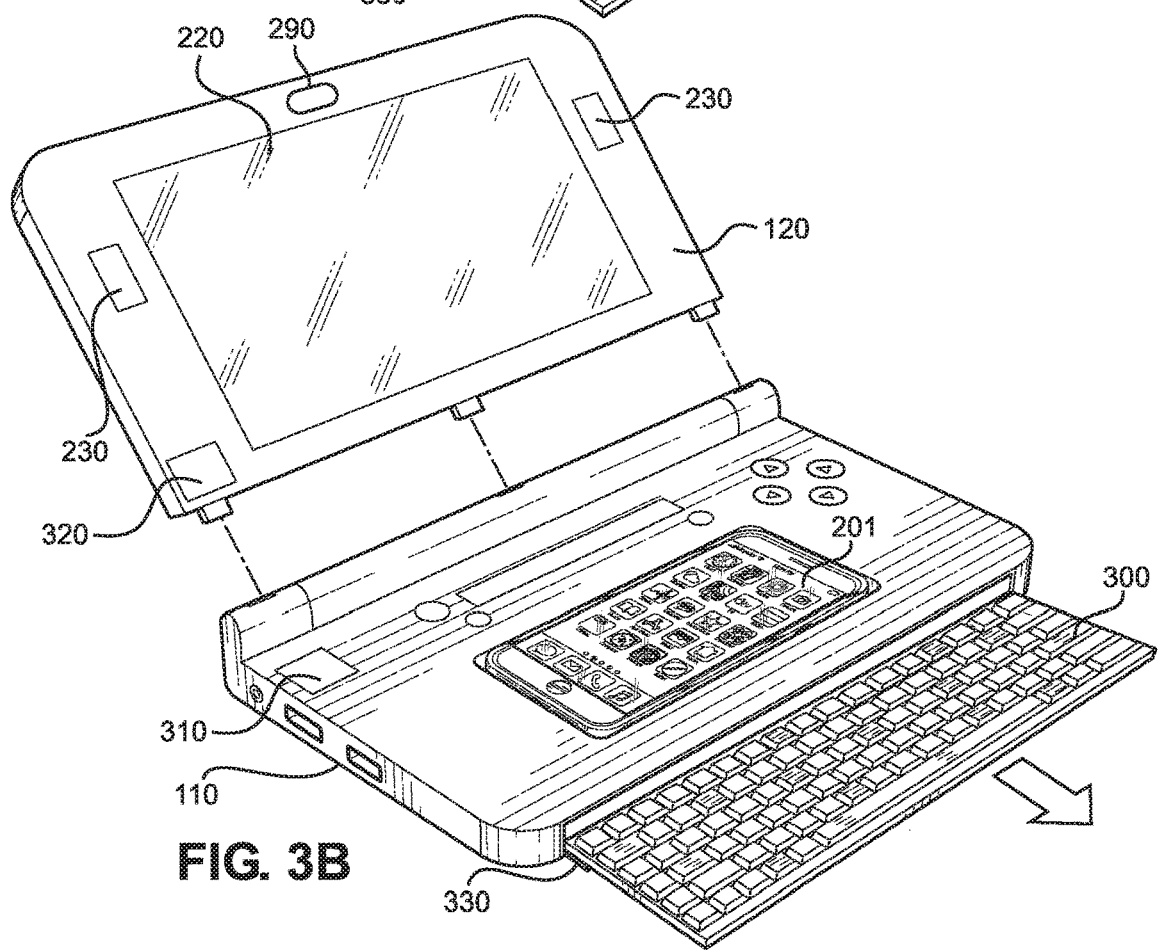
FIG. 3B shows a front perspective view of an embodiment of the electronic device case, with a focus on the keyboard.

Referring now to FIGS. 3A and 3B, there are shown a front perspective view of an embodiment of the electronic device case, with a focus on the removably securable protective flap member and a front perspective view of an embodiment of the electronic device case, with a focus on the keyboard. In one embodiment, the electronic device case further comprises a keyboard 300 slidably disposed within the protective base member 110. In the shown embodiment, the keyboard 300 is received by a slot in the protective base member 110, wherein the slot is sized to receive the full keyboard 300. In such an embodiment, the keyboard 300 is flush with a side of the protective base member 110 when fully retracted. In one embodiment, the keyboard 300 is a standard 101-key keyboard. In other embodiments, the number of keys is varied, and some individual keys may be utilized for a number of characters. In one embodiment, the keys are push-button. In an alternate embodiment a flap 330 is pivotally attached to the protective base member 110 and can be rotated about a hinge between a storage and expanded configuration. In the storage configuration the flap 330 rests in the same plane as the protective base member 110 such that the flap 330 covers the slot. In the expanded configuration, the flap 330 rests perpendicular to the plane of the protective base member 110, thereby allowing the keyboard 300 to slide out of the slot.

In one embodiment, a first wireless transceiver 310 is disposed in the protective base member 110 which operably connects the electronic device case to the electronic device 201. A second wireless transceiver 320 is disposed in the protective flap member 110 which operably connects the display screen 220 and at least one speaker 230 to the protective base member 110 and the electronic device 201. The wireless transceivers 310, 320 eliminate the need for a wired connection between the electronic device 201 and the electronic device case which reduces potential wear and tear on the connection port as can be experienced in a wired connection. In a further embodiment, the protective flap member 110 is removably securable to the protective base member 110. In such an embodiment, the protective flap member 110 selectively pivots between an open and a closed orientation, but also provides the user with the option of removing the protective flap member 120 while remaining operably connected to the protective base member 110 and the electronic device 201 via the wireless connection achieved via the wireless transceivers 310, 320. In a further embodiment, the display screen 220 is a touch display. The touch display is configured to receive and transmit input from the user's touch on the display via the second wireless transceiver 320. In such a manner, the protective flap member 120 can be utilized as a tablet.

In one embodiment in the same manner as the display screen 220, the camera 290 can be operably connected to the electronic device 201. In one embodiment, the camera 290 is connected to the electronic device 201 via at least one wire. In another embodiment, the camera 290 is connected to the electronic device 201 via the wireless transceivers 310, 320. One of ordinary skill in the art will understand that the camera 290 can be operably connected to the electronic device 201, such that the camera 290 can be utilized in combination with programs and applications on the electronic device 201.

Referring now to FIG. 4, there is shown a bottom-up view of an embodiment of the electronic device case. In one embodiment, a handle 400 is disposed on the exterior base surface 450. In the shown embodiment, the handle 400 comprises a depression 401 and a strap 402 that forms a bridge over the depression 401. The depression 401 is sized to receive a user's finger therethrough while the strap 402 keeps the user's finger in the depression 401. In this manner, the user can hold on to the electronic device case in order to support and transport the electronic device case in an easy manner. The handle 400 can also be utilized to maintain the electronic device case at a desired angle such that the user can easy view the display screen in a desired orientation.

In one embodiment, a kickstand 410 is disposed on the exterior base surface 450. Similar to the handle 400, the kickstand 410 can be utilized to maintain the electronic device case at a desired angle such that the user can easy view the display screen in a desired orientation. In the shown embodiment, the kickstand 410 is pivotally attached to the exterior base surface 450 by a pair of kickstand hinges 430 such that the kickstand 410 can be deployed and rotated into a supportive position. When not in use, the kickstand 410 can be rotated such that it lies flush with the exterior base surface 450. In a further embodiment, the exterior base surface 450 includes a channel in which the kickstand 410 can be stored, such that the kickstand 410 does not interfere with the base of the electronic device case lying flat on a surface.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. An electronic device case, comprising:
a protective base member and a protective flap member;

the protective base member further comprising a recess disposed in an interior base surface, wherein the recess is configured to removably receive an electronic device;
a connection port disposed in the recess, wherein the connection port operably connects the electronic device to the electronic device case;
a display screen disposed in an interior flap surface of the protective flap member;
the display screen in operable connection with the connection port, such that the display screen can display video output of the electronic device;
at least one speaker disposed on an interior flap surface of the protective flap member;
the protective flap member is pivotally affixed to the protective base member and the protective base member and the protective flap member selectively moveable between an open and a closed orientation;
a plurality of input buttons disposed on the interior base surface of the protective base member;
a keyboard slidably disposed within the protective base member between the interior base surface and an exterior base surface.

2. The electronic device case of claim 1, further comprising at least one external connection port configured to removably receive a removable storage device.

3. The electronic device case of claim 2, wherein at least one external connection port is configured to receive a flash drive.

4. The electronic device case of claim 2, wherein at least one external connection port is configured to receive a memory card.

5. The electronic device case of claim 1, further comprising a headphone port.

6. The electronic device case of claim 1, further comprising a handle disposed on the exterior base surface.

7. The electronic device case of claim 1, further comprising a kickstand disposed on the exterior base surface.

8. The electronic device case of claim 1, wherein the connection port includes a wired connection between the electronic device and the electronic device case.

9. The electronic device case of claim 8, wherein the connection port is a USB port.

10. The electronic device case of claim 1, wherein the closed orientation is defined by the interior flap surface of the protective flap member resting against the interior base surface of the protective base member.

11. The electronic device case of claim 1, wherein the protective flap member is pivotally affixed to the protective base member via a hinge.

12. The electronic device case of claim 11, wherein the hinge runs along the majority of a perimeter length of the protective flap member and is received by a pair of protrusions disposed on opposing ends of the protective base member.

13. The electronic device case of claim 1, further comprising an external display disposed on an external flap surface of the protective flap member.

14. The electronic device case of claim 1, wherein the plurality of input buttons comprises a first plurality of input buttons disposed on a first side of the interior base surface of the protective base member and a second plurality of input buttons disposed on a second side of the interior base surface of the protective base member and wherein the recess is disposed between the first plurality of input buttons and the second plurality of input buttons.

15. The electronic device case of claim 1, wherein the at least one speaker comprises a pair of speakers, each speaker of the pair of speakers disposed on an opposing side of the display screen.

* * * * *